United States Patent [19]

Piper

[11] 3,754,740
[45] Aug. 28, 1973

[54] GAS DISTRIBUTOR
[75] Inventor: Louis H. Piper, Richmond, Va.
[73] Assignee: Westinghouse Electric Corporation, Pittsburgh, Pa.
[22] Filed: Feb. 18, 1971
[21] Appl. No.: 116,495

[52] U.S. Cl. ................................ 261/124, 239/534
[51] Int. Cl. .............................................. B01f 3/04
[58] Field of Search ...................... 261/121 R, 124; 239/534

[56] References Cited
UNITED STATES PATENTS

| | | | |
|---|---|---|---|
| 3,294,380 | 12/1966 | Born | 261/121 |
| 2,603,465 | 7/1952 | Malzacher | 261/14 |
| 2,476,320 | 7/1949 | Paulus | 137/525.5 X |
| 3,179,124 | 4/1965 | Haring | 137/516.11 |
| 3,334,819 | 8/1967 | Olavson | 239/534 |
| 2,106,775 | 2/1938 | Trask | 230/221 |
| 2,986,383 | 5/1961 | Lowry | 261/124 |
| 2,402,132 | 6/1946 | Goldberg | 261/124 |
| 3,608,834 | 9/1971 | MacLaren | 137/525.3 X |

*Primary Examiner*—Tim R. Miles
*Assistant Examiner*—William Cuchlinski, Jr.
*Attorney*—A. T. Stratton, Z. L. Dermer and M. B. L. Hepps

[57] ABSTRACT

A conical chamber having a serrated bottom edge is provided with a centrally and upwardly supported bottom plate in order to distribute gas bubbles throughout a liquid when a gas is introduced under pressure into the chamber. In one embodiment, a second plate contacting the inner wall of the conical chamber, or an annular ledge formed thereon, acts as a check valve in the event of a gas pressure failure. In another embodiment, a resilient sleeve fitted about a gas inlet pipe having only circumferential openings acts as the check valve.

6 Claims, 5 Drawing Figures

Patented Aug. 28, 1973

WITNESSES
Theodore H. Wrobel
James H. Young

INVENTOR
Louis H. Piper
BY M. B. L. Piper
ATTORNEY

GAS DISTRIBUTOR

BACKGROUND OF THE INVENTION

This invention pertains to gas diffusers and more particularly to mechanical diffusers provided with a plurality of small openings through which gas bubbles may pass.

In sewage or water treatment units, aeration is utilized to provide oxidation and circulation within the treatment tank. Oxidation and circulation proceed more efficiently where a uniform pattern of small air bubbles are continuously produced proximate the bottom of such a tank.

Methods for introducing gas into sewage and waste water generally fall into the category of (1) diffuser aeration systems wherein air under pressure is delivered to a diffuser which introduces the air as fine bubbles into the liquid and (2) mechanical aeration system wherein entrainment of oxygen is achieved by agitating the liquid with a rotating impeller device which promotes contact between atmosphere in air and the liquid undergoing treatment.

For many years, porous media diffusers made of ceramic stone or bonded aluminum oxide were the most widely accepted means of introducing air or gas into waste liquid, but due to problems of clogging, they have been generally replaced by either mechanical surface type aerators or compressed air diffusers utilizing a mechanical means such as a perforated pipe to produce the small air bubbles required. Mechanical aerators are high in first cost and although quite efficient require constant maintenance. Perforated pipe diffusers, although less expensive, have often been inefficient in transferring oxygen into a liquid, moreover, such diffusers also suffer from the problem of clogging Clogging results from debris accumulation either within the bubble producing openings in a diffuser or due to debris accumulation in the body of the diffuser itself. A major source of debris accumulation is a failure of the pressurized gas supply system. In the event of such a failure, liquid would normally fill the internal chamber within the gas distribution device carrying with it any suspended solids; which after repeated gas supply failure could partially fill the chamber and clog the gas diffusion holes.

SUMMARY OF THE INVENTION

Debris accumulation within the internal structure including the gas distribution openings of a diffuser is minimized in accordance with this invention by the provision of a check valve type structure within the body of the diffuser.

The diffuser itself comprises a generally conical chamber having a serrated bottom edge. A relatively stiff bottom plate is laterally supported by the gas inlet conduit between a locking nut and an annular ledge formed on the inlet conduit. The bottom plate extends across the bottom of the conical chamber to within a small distance of the periphery. The gas inlet line has a plurality of circumferential openings through which gas gains ingress to the conical chamber formed within the diffuser. The gas then proceeds through the openings formed by the serrated bottom edges of the conical structure and the bottom plate so as to produce a plurality of small bubbles uniformly spaced about the periphery of the chamber.

In one embodiment of the invention, a second relatively flexible plate is situated contacting the bottom plate and against the annular ledge formed in the gas inlet line and extends outwardly so as to firmly contact the inner surface of the conical chamber, or an annular ledge formed thereon. This plate or formed diaphragm may be flat or slightly dished at at edge so as to provide firm contact with the inner surface upon which it seats. Normally the air pressure causes the gas to escape around the edges of this diaphragm. However, in the event of a gas failure, the diaphragm, because of its resilience, firmly seats against the annular ledge of the conical chamber so as to prohibit fluid and more specifically the debris carried therein, from entering the interstices of the conical chamber.

In a second embodiment, a resilient sleeve is placed around a portion of the gas inlet pipe internal of the conical chamber so as to normally cover the circumferential opening through which gas enters the conical chamber. The resilience of the sleeve allows the gas to expand to enter the conical chamber from which it escapes through the serrated openings. However, in the event of gas failure, the resilient sleeve closes off these openings so that fluid and debris cannot enter the gas inlet lines.

DESCRIPTION OF THE DRAWINGS

For a better understanding of the invention, reference may be had to the accompanying illustration embodiments, in which.

DESCRIPTION OF THE PREFERRED EMBODIMENTS

Figure 1:
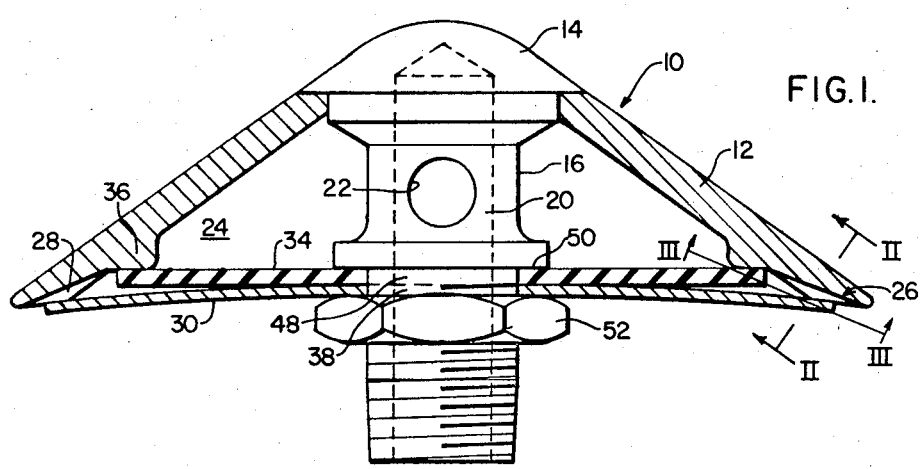
FIG. 1 shows an embodiment of a gas diffuser in accordance with this invention.
Figure 5:
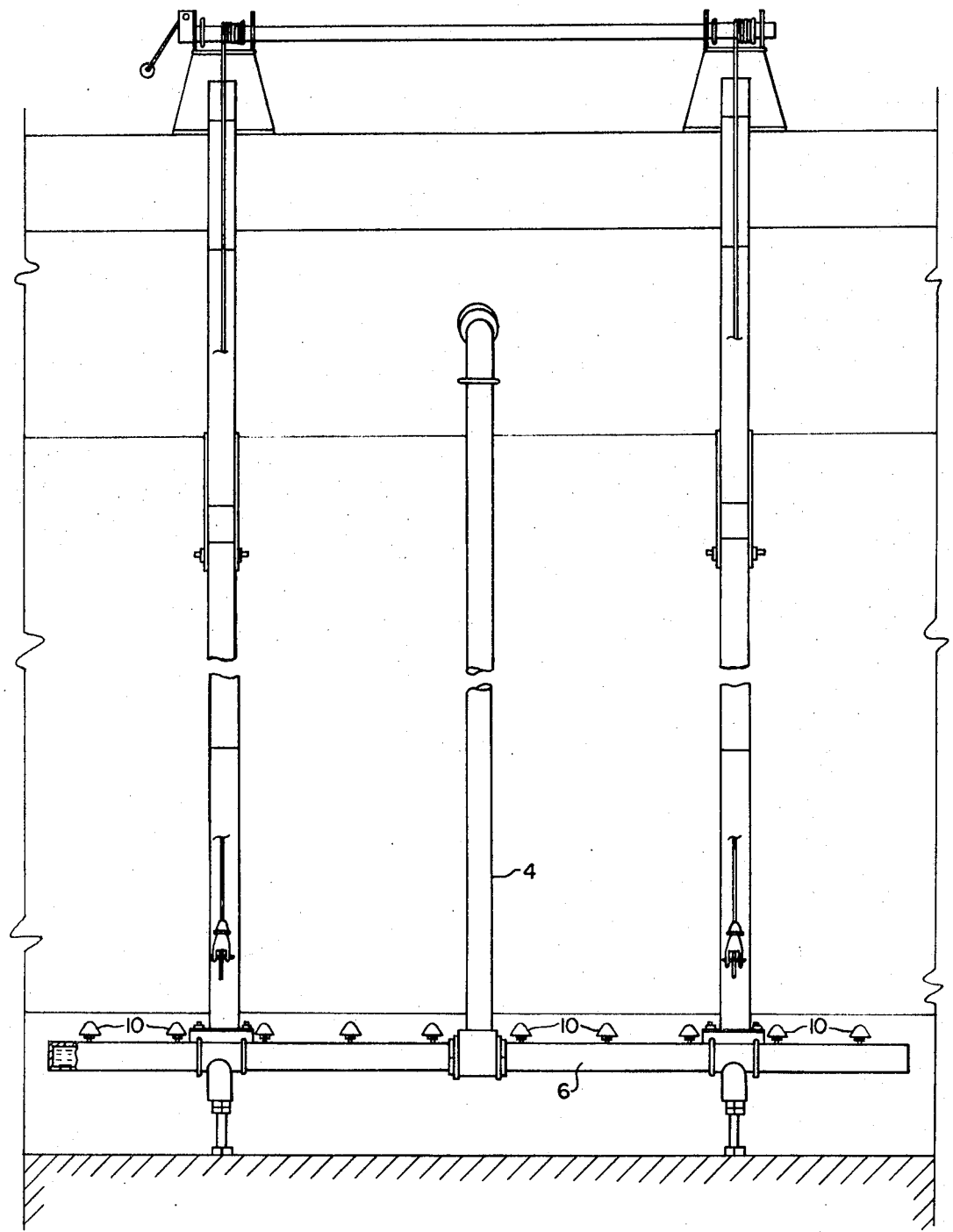
FIG. 5 shows a suitable system for utilizing the diffusers depicted in the previous figures.

Referring to FIG. 1, there is shown a diffuser 10 of a design suitable for both providing oxidation and circulation within a treatment tank 2. The diffuser system of FIG. 5 generally includes a source of gas pressure (not shown) and a conduit 4 which conveys the gas to a manifold 6. A plurality of diffusers 10 are coupled to a single manifold 6. The gas supply arrangement depicted is shown and described in greater detail in a copending application Ser. No. 108,041, filed Jan. 20, 1971 by L. A. McKinney on a Method and Apparatus for Gas Diffusion. The diffusers 10 are mounted vertically above the manifold 6.

The diffuser 10 is preferably constructed from a small number of easily formed parts which can be readily assembled and disassembled. The umbrella 12 of the diffuser 10 is preferably formed as a single unit of a generally wide-angled conical form. Its apex is closed by a stem 14 which can be simply cemented to the umbrella 12. The stem 14 is formed integral with and as an extension of an inlet pipe 16. The inlet pipe 16 has a central bore 20 and a plurality of circumferential openings 22 through which a gas, such as air in the case of sewage aeration, can be fed to a chamber 24 formed within the umbrella 12.

Figure 3:
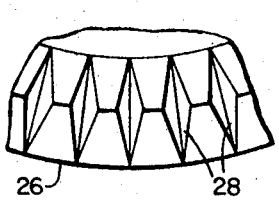
FIG. 3 shows a sectional view along line III—III of FIG. 1.
Figure 2:
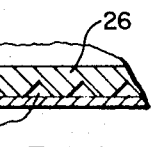
FIG. 2 shows a sectional view along line II—II of FIG. 1.

The bottom peripheral edge 26 of the umbrella 12 has a plurality of serrations 28 formed therein, see FIG. 2. The serrations 28 are preferably configured as elongated diamonds when seen in plan view as in FIG. 3. The serrations 28 assure a relatively uniform bubble pattern even where the diffusers 10 are not exactly perpendicular to the bottom of the treatment tank.

A disc 30 of a relatively stiff material such as metal or fiber glass preferably extends substantially but not entirely across the mouth of the chamber 24. The cooperattive association of the diamond shaped serrations 28 in the umbrella 12 and the disc 30 form gas channels 32 through which gas may pass into a liquid in the form of relatively small bubbles. The size of the bubbles formed is determined by both the triangular channels 32 left between the periphery of the disc 30 and the outward apex of the diamond shaped serrations 28 and the gas pressure within the chamber 24. Increasing gas pressures tend to lift the edge of the disc 30 so as to expand the triangular gaps or openings 32.

As previously indicated, both the interstices of the chamber 24 and the openings 32 can be clogged by debris accumulation due to liquid and particle ingress upon repeated gas pressure failures. A check valve structure including a diaphragm 34 of a flexible material such as rubber or soft plastic, and, where desired, an annular ledge 36, formed on the inner wall of the umbrella 12, is utilized to prohibit such ingress of particles. In the event of a pressure failure, the diaphragm 34 is biased to seat against the ledge 36.

The disc 30 and the diaphragm 34 are provided with centrally located openings 38 and 48, respectively, so that these members, 30 and 34, can be slipped over the pipe 16. The members, 30 and 34, are butted against an outwardly protruding annular flange 50 on the pipe 16 and a locknut 52 is screwed tight against the disc 30 to hold the members, 30 and 34, in their desired positions.

Figure 4:
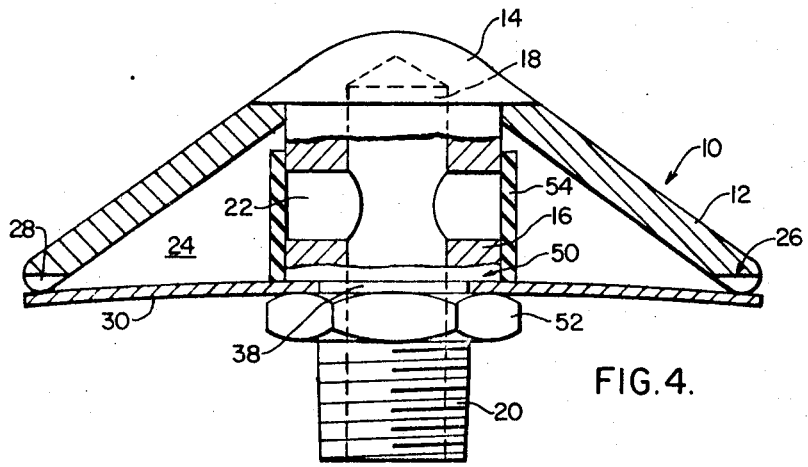
FIG. 4 shows a second embodiment of the diffuser having a different check valve structure therein.

As an alternate to the above scheme, the diaphragm 34 may be replaced by a resilient sleeve 54; see FIG. 4, where like numerals designate similar structure. The flange 50 in this embodiment is inwardly extending such that the portion of the pipe 16 which contains the circumferential openings 22 is of uniform diameter. The sleeve 54 is filtered about and is substantially coextensive with this portion.

The sleeve 53 which may be made of rubber is expanded to allow egress of gas as long as the pressure in pipe 16 is greater than that within chamber 24. However, in the event of a pressure failure, the sleeve 54 is forced against the pipe 16 so as to seal the openings 22 and prevent ingress of liquid and particles into the pipe 16.

As previously described, a plurality of diffusers 10 may be supplied with gas from a single source through one or more manifolds 6. Should the pressure in a manifold 6 be inadvertently reduced, all of the diffusers 10 are prevented from debris accumulation by the check valve structures integrally associated with each diffuser 10.

Therefore, I claim:

1. A gas distribution nozzle comprising, in combination:
    a hollow body formed of a generally conical umbrella like member, said member being closed at its apex and open at the end opposite the apex of the conical form to provide a gas outlet adjacent said open end,
    a relatively stiff bottom plate normally biased against the peripheral edge of said member;
    conduit means within said hollow body for connection to a source of gas pressure; and
    a check valve member internal of the hollow body positioned intermediate said conduit means and said outlet.

2. The gas distribution nozzle of claim 1 including a plurality of serrated opening formed in the peripheral edge of the umbrella-like member.

3. The gas distribution nozzle of claim 2 wherein the internal angle formed within the conical wall of the hollow body is relatively wide and the bottom plate is within the periphery of the conical member.

4. The gas distribution nozzle of claim 2 including a relatively resilient plate supported within the conical member inwardly of and adjacent said bottom plate, an annular ledge formed on the inner wall of the conical member, and means biasing the resilient plate against the annular ledge and said bottom plate positioned to limit the movement of said resilient plate away from said ledge.

5. The gas distribution nozzle of claim 2 wherein said conduit means comprises a pipe protruding throu1h the bottom plate and having only circumferential openings and including a resilient sleeve fitted about the portion of the pipe having said openings so as to seal said openings whenever sufficient pressure does not exist to expand said sleeve.

6. A gas distribution system for providing oxidation and circulation within a fluid including:
    a tank;
    a source of gas pressure mounted proximate said tank;
    a manifold supported within said tank and flow-coupled to said source through a conduit extending therebetween;
    a plurality of diffusers mounted on said manifold and having conduit means therein respectively adapted to be supplied with a pressurized gas therefrom, each said diffuser comprising a hollow body formed of a generally conical umbrella-like member, said member being closed at its apex and open at the end opposite the apex of the conical member to provide a gas outlet adjacent said open end,
    a relatively stiff bottom plate normally biased against the peripheral edge of said members, and
    a check valve member internal of said hollow body positioned intermediate said conduit means and said outlet, said diffusers being mounted vertically above said manifold.

* * * * *